United States Patent [19]
Morroni

[11] 3,903,754
[45] Sept. 9, 1975

[54] BICYCLE CRANK HUB ASSEMBLY

[75] Inventor: Pino D. Morroni, Warren, Mich.

[73] Assignee: Pino International Ltd., Clawson, Mich.

[22] Filed: June 7, 1974

[21] Appl. No.: 477,200

[52] U.S. Cl. ........... 74/594.1; 74/594.2; 308/179.5; 308/192
[51] Int. Cl.² ...................... B62M 3/00; F16C 9/02
[58] Field of Search ....... 74/591.1, 591.2; 308/23.5, 308/179.5, 192

[56] References Cited
UNITED STATES PATENTS

| | | | |
|---|---|---|---|
| 523,562 | 7/1894 | Wilcox | 308/192 |
| 627,597 | 6/1899 | Scott | 74/594.2 |
| 634,525 | 10/1899 | Hance | 308/179.5 |
| 640,649 | 1/1900 | Gorman | 74/594.2 |
| 2,699,648 | 1/1955 | Berkey | 60/39.66 |
| 3,430,443 | 3/1969 | Richardson et al. | 60/39.65 |
| 3,578,829 | 5/1971 | Hata et al. | 74/594.1 X |
| 3,671,171 | 6/1972 | Doyle | 60/39.65 |
| 3,854,285 | 12/1974 | Stenger et al. | 60/39.66 |

FOREIGN PATENTS OR APPLICATIONS

| | | | |
|---|---|---|---|
| 3,964 | 2/1913 | United Kingdom | 308/192 |
| 623,094 | 6/1927 | France | 308/192 |
| 1,693 | 11/1916 | Netherlands | 308/192 |

Primary Examiner—Samuel Scott
Assistant Examiner—F. D. Shoemaker
Attorney, Agent, or Firm—McGlynn and Milton

[57] ABSTRACT

A crank shaft assembly for a bicycle hub which permits accurate adjustment of the crank shaft including a housing member, a shaft member within the housing member, bearings for rotatably supporting the shaft member, and adjustable retaining members for retaining the shaft member in the housing member and for adjusting the axial position of the shaft member with respect to the housing member.

35 Claims, 3 Drawing Figures

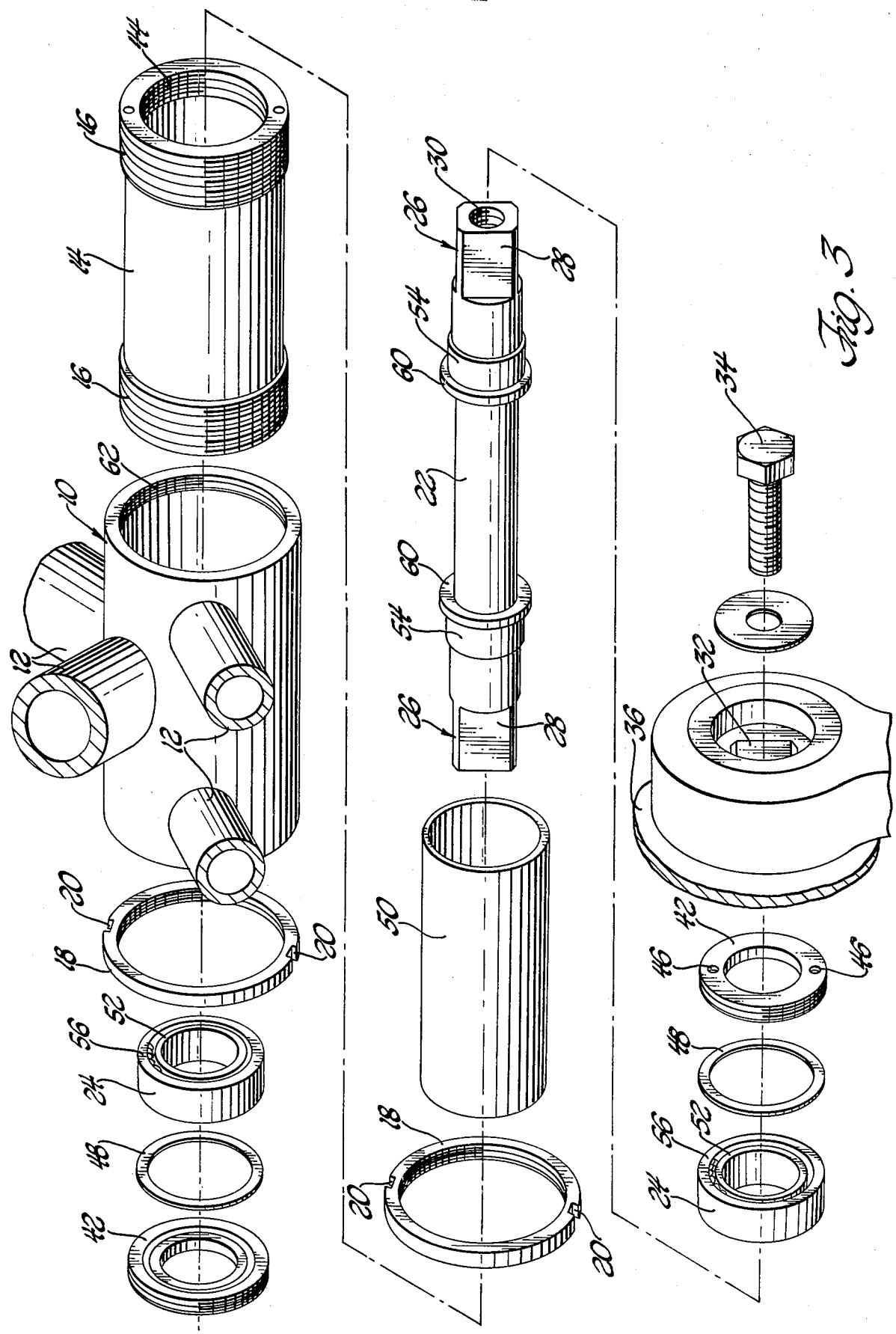

BICYCLE CRANK HUB ASSEMBLY

This invention relates to an assembly for supporting the pedal crank shaft of a bicycle.

Bicycles, and particularly the sophisticated multi-speed models, must be manufactured with a high degree of precision and be accurately assembled and adjusted to ensure optimum performance. Even slight power losses, due to friction caused by misalignment or improperly adjusted parts, are significant in view of the fact that all the power for operating the bicycle is derived from the rider. Such power losses take on even more importance when the bicycle is operated for long periods of time, such as in a long distance bicycle race. It is important, therefore, to eliminate sources of power loss or at least reduce power loss so that the maximum amount of power will be used to drive the bicycle.

In this regard, one particularly critical area is the pedal crank shaft which carries the chain sprocket and pedals. To ensure proper operation of the bicycle, the chain sprocket on the crank shaft must be accurately aligned with the chain sprocket on the rear wheel. In many bicycle hub assemblies, the crank shaft is supported within the hub casing by bearings and is held in place by threaded caps which engage internal threads in the hub casing. With a construction of this type, the axial position of the crank shaft is fixed with respect to the hub casing. In order to ensure accurate alignment of the chain sprocket, the hub casing must be manufactured to extremely close tolerances. These close tolerances, however, are lost when the hub casing is welded to the frame of the bicycle due to thermal distortion. Consequently, misalignment of the chain sprocket often occurs regardless of the care exercised in machining the hub casing. In short, problems arise when the location of the crank shaft depends on the dimensional accuracy of the hub casing.

Additionally, due to the connection between the crank shaft hub casing, it is not possible to adjust the lateral position of the crank shaft, and consequently the chain sprocket, in the event that misalignment occurs. For example, in U.S. Pat. No. 1,856,959 issued May 3, 1932, the position of the crank shaft is fixed since the outer race of the bearings which support it abut an annular shoulder in the hub casing. French Pat. No. 898,478 published Apr. 24, 1945, also illustrates a pedal crank shaft for a bicycle which has a fixed location relative to the hub casing and cannot be adjusted.

Accordingly, the instant invention provides an assembly for supporting the pedal crank shaft such that the lateral position of the crank shaft with respect to the hub casing may be adjusted. The assembly includes a housing member, a shaft member within the housing member, bearing means for rotatably supporting the shaft member, and adjustable retaining means for retaining the shaft member in the housing member and for adjusting the axial position of the shaft member with respect to the housing member. More specifically, the housing member is axially movably supported in the hub casing and includes suitable locking means for locking the housing member in position with respect to the hub casing. The shaft member is supported at each end by a pair of bearing members which are held in fixed, spaced relationship by means of a movable spacer member which is movable with respect to the housing member. The adjustable retaining means includes externally threaded plug members enclosing each end of the housing member and threadedly, axially movable therein to adjust the location of the shaft member with respect to the housing member.

Other purposes and functions of the instant invention will be readily appreciated as the same becomes better understood by reference to the following detailed description when considered in connection with the accompanying drawings wherein:

FIG. 3 is an exploded perspective view of the elements of the preferred embodiment of the instant invention.

Figure 1:
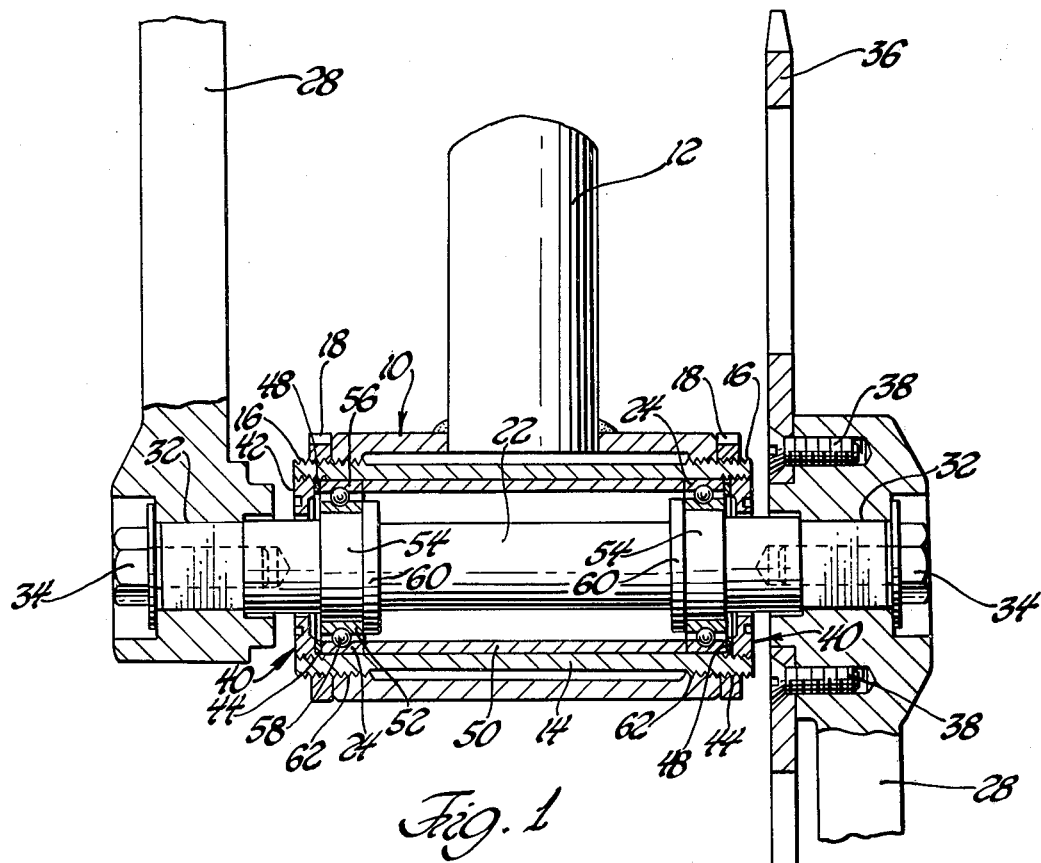
FIG. 1 is an elevational cross-sectional view of a preferred embodiment of the instant invention supported in a threaded hub casing.

Referring to the drawings, a standard hub casing is generally indicated at 10 supported by the standard frame members 12 of a bicycle.

The crank shaft assembly includes a housing member 14 which comprises a cylindrical shell or tube axially movably supported in the hub casing 10. The ends of the housing member 14 extend from the ends of the hub casing 10 and include external threaded portions 16 for receiving an internally threaded locking nut 18 for locking the housing member in position with respect to the hub casing 10. As best shown in FIG. 3, the lock nuts 18 may be provided with notches 20 by which the lock nuts 18 may be engaged and rotated by a suitable tool, such as a spanner wrench.

It is noted that the fabrication costs of the housing member 14 are relatively low since it is made from common tube stock of aluminum or other lightweight metal. In short, the housing member 14 provides a housing within a housing. That is, in conventional bicycles the "housing" consists simple of the interior of the hub casing 10 which, as noted above, is subject to dimensional distortion. The housing member 14, however, provides a housing of accurate dimension within the hub casing 10.

A shaft member 22 is disposed within the housing member 14 and is rotatably supported by bearing means comprising the two bearing members 24 disposed generally adjacent the two ends of the shaft member 22. Each end of the shaft member 22 includes connection means, generally indicated at 26, for connecting a pedal arm 28 thereto. In the assembly shown, the connection means 26 includes a squared end portion 28 and a threaded hole 30 which cooperate with a square hole 32 in the pedal arm 28 and a threaded fastener 34 for connecting the pedal arms 28 to the shaft member 22. One of the pedal arms 28 carries a chain sprocket 36 which is connected to the central hub portion of the pedal arms by means of fasteners 38. It is noted that other connecting means for connecting the pedal arms 28 to the ends of the shaft member 22 may be provided and that the connection means shown is merely by way of example.

Adjustable retaining means, generally indicated at 40, is provided for retaining the shaft member 22 in the housing member 14 and for adjusting the axial or lateral position of the shaft member 22 with respect to the housing member 14. The adjustable retaining means 40 includes an externally threaded plug member 42 enclosing each end of the housing member 14. The housing member 14 includes an internal threaded portion 44 at each end thereof wherein the width of the threaded portion 44 is greater than the width of the plug member 42. The plug member 42 is thereby capable of moving threadedly axially with respect to the housing member 14. To facilitate such movement, the plug members 42 include a pair of blind holes 46, as best shown in FIG. 3, for permitting engagement and rotation thereof by a suitable tool. A thrust washer member 48 made of a suitable material, such as nylon, is disposed between the inner face of the plug member 42 and the bearing member 24 to prevent loosening of the plug member 42 once it has been tightened in place.

Movable spacer means or sleeve 50 is disposed within the housing member 14 and is positioned between the bearing members 24 to establish a fixed distance of separation between the bearing members. The movable spacer means 50 comprises a tubular sleeve which is circular in transverse cross section and has an outside diameter approximating, but slightly less than, the inside diameter of the housing member 14. As will become more apparent hereinafter, the movable spacer means 50 serves to accurately position the bearing members 24 with respect to the shaft member 22.

Figure 2:
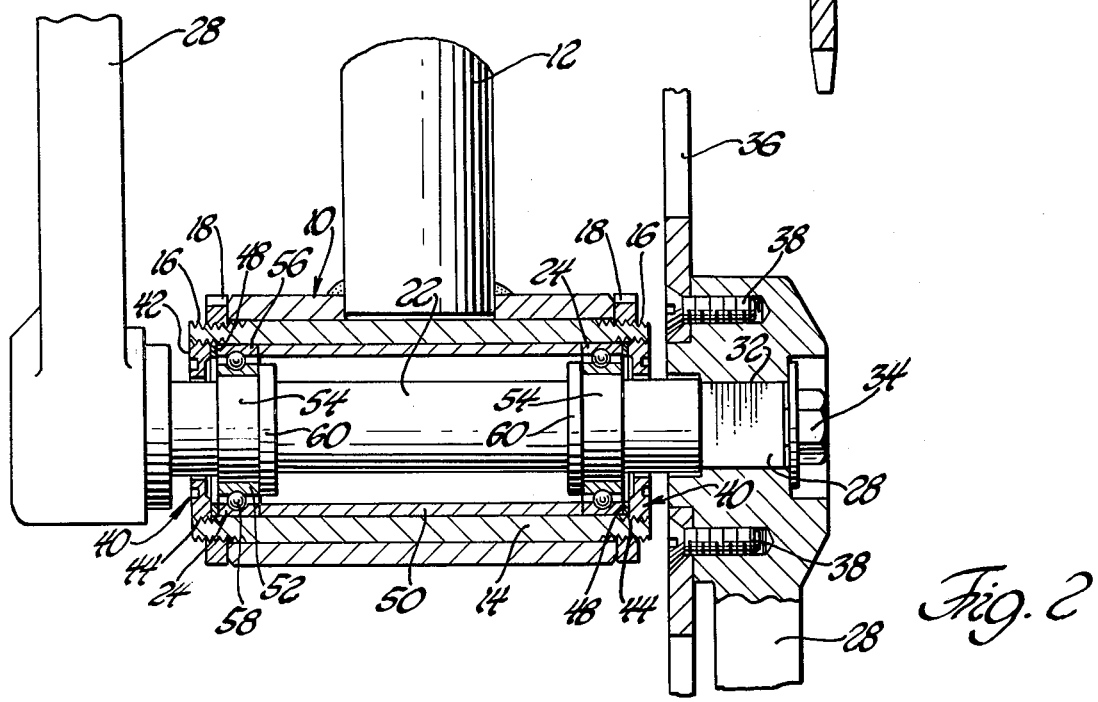
FIG. 2 is an elevational cross-sectional view of a slightly modified preferred embodiment of the instant invention supported in an unthreaded hub casing.

The bearing members include an inner race member 52 which is received on an annular surface 54 of the shaft member 22. The bearing members 24 also include an outer race member 56 and a plurality of ball bearings 58 disposed between the inner and outer race members. As shown in FIGS. 1 and 2, each of the inner race members 52 abuts a flange 60 on the shaft member 22. The movable spacer means 50 engages the outer race member 56 so that the bearing member 24 will not be distorted when the plug members 42 are tightened into place. The spacer means 50 therefore ensures proper operation of the bearing members 24 by preventing misalignment or cocking of the race members. The shaft member 22, therefore, does not experience added frictional drag due to distorted bearings.

It is intended that the shaft member 22, bearing members 24, spacer means 50, washer members 48 and plug members 42 be all preassembled in the housing member 14. The crank shaft assembly, thus preassembled, may then be introduced into the hub casing 10 of the bicycle. Generally, the hub casing 10 will include internal threaded sections 62 at each end thereof, as shown in FIGS. 1 and 3. In a hub casing of this type, the housing member 14 is threaded into the hub casing 10 and is roughly positioned therein so that the chain sprocket 36 will be generally aligned when it is attached to the shaft member 22. The lock nuts 18 are then threaded on the external threaded portion 16 of the housing member 14 and tightened against the hub casing to lock the housing member 14 in position with respect to the hub casing 10. Once the housing member 14 is secured in place at the proper location, it becomes, in effect, part of the hub casing 10 and need not be removed. In the event that the bearing members need to be replaced, it is only necessary to remove the plug members 42 for access to the interior of the housing 14.

Precision adjustment of the location of the shaft member 22 can be made by moving the plug members 42 axially within the housing member 14. For example, if the shaft member 22 must be moved to the right as viewed in FIG. 1, the right-hand plug member 42 is threaded outwardly and the left-hand plug member 42 is threaded inwardly until the proper location of the shaft member 22 is attained. It is noted that during such adjusting movement, the bearing members 24 and the spacer means 50 move along with the shaft member 22. Once the position of the shaft member 22 has been accurately located, the pedal arms 28 may then be connected to the shaft member 22.

Since it is difficult to maintain the dimensional accuracy of the hub casing 10 during the welding operation for attaching the frame members, it may be desirable to eliminate the internal threads on the hub casing 10 altogether. Additionally, elimination of the threads in the hub casing 10 reduces the machining costs as well as the weight of the bicycle. Such a hub casing 10 is shown in FIG. 2. The hub casing 10 may either be manufactured without the internal threaded sections to take advantage of the reduction in manufacturing costs or the internal threaded sections of a hub casing may be subsequently reamed out by the purchaser of the bicycle. In such cases, the outer diameter of the housing member 14 closely approximates the inner diameter of the hub casing 10. Without the internal threaded section in the hub casing, the housing member 14 is axially, slidably movable. Additionally, since all welding operations have been completed, the internal diameter of the hub casing 10 may be accurately formed by the reaming operation to snugly receive the housing member 14.

Along these same lines, it is noted that the standard size of the hub casing 10 varies from country to country. That is, the inner diameter of the hub casing 10 in an Italian bicycle is different from that in an English bicycle. These size differences, however, are relatively small being on the order of fifty to sixty thousandths of an inch. Therefore, the outer diameter of the housing member 14 may be machined to the size required in the particular hub casing. For example, the side walls of the housing member shown in FIG. 1 are somewhat smaller than the side walls in the housing member 14 shown in FIG. 2. In other words, it is possible to size the outer diameter of the housing member 14 without changing the dimensions of any of the other components.

To summarize, the instant invention provides a crank shaft assembly for bicycles which enables accurate adjustment of the shaft position to ensure optimum performance of this portion of the bicycle. This is accomplished by providing a dual adjustment, that is, pemitting coarse adjustment by changing the position of the housing member 14 with respect to the hub casing 10 and fine adjustment by changing the position of the shaft with respect to the housing member 14.

The invention has been described in an illustrative manner, and it is to be understood that the terminology which has been used is intended to be in the nature of words of description rather than of limitation.

Obviously, many modifications and variations in the instant invention are possible in light of the above teachings. It is therefore, to be understood that the invention may be practiced otherwise than as specifically described and yet remain within the scope of the depending claims.

The embodiments of the invention in which an exclusive property or privilege is claimed are defined as follows:

1. A crank shaft assembly comprising: a housing member, a shaft member within said housing member, bearing means for rotatably supporting said shaft member, said shaft member and bearing means being axially movable within said housing member over a continuous range of adjusted positions, and adjustable retaining means movable axially with respect to said housing member for retaining said shaft member in said housing member and for effecting adjustment of the axial position of said shaft member with respect to said housing member.

2. An assembly as set forth in claim 1 wherein said bearing means includes a bearing member rotatably supporting each end of said shaft member.

3. An assembly as set forth in claim 2 including movable spacer means positioned between said bearing members for establishing a fixed distance of separation between said bearing members.

4. An assembly as set forth in claim 3 wherein said adjustable retaining means includes an externally threaded plug member enclosing each end of said housing member.

5. An assembly as set forth in claim 4 wherein said housing member includes an internal threaded portion at each end thereof, the width of said threaded portion being greater than the width of said plug member.

6. An assembly as set forth in claim 5 including a thrust washer member disposed between said plug members and said bearing members.

7. An assembly as set forth in claim 6 wherein each of said bearing members includes an inner race member and said shaft member includes an annular surface at each end thereof for receiving said inner race member.

8. An assembly as set forth in claim 7 wherein each of said bearing members includes an outer race member and a plurality of ball bearings disposed between said inner and outer race members.

9. An assembly as set forth in claim 8 wherein said shaft member includes connection means at each end thereof for connecting a pedal arm thereto.

10. An assembly as set forth in claim 6 wherein said housing member includes an external threaded portion at each end thereof.

11. An assembly as set forth in claim 10 wherein said plug members include tool engaging means.

12. A crank shaft hub assembly comprising: a hub casing, an axially movable housing member within said hub casing, locking means for locking said housing member in position with respect to said hub casing, a shaft member within said housing member, bearing means within said housing member for rotatably supporting said shaft member, said shaft member and bearing means being axially movable within said housing member over a continuous range of adjusted positions, and adjustable retaining means movable axially with respect to said housing member for retaining said shaft member in said housing member and for effecting adjustment of the axial position of said shaft member with respect to said housing member.

13. An assembly as set forth in claim 12 wherein said adjustment retaining means includes an externally threaded plug member enclosing each end of said housing member.

14. An assembly as set forth in claim 13 wherein said housing member includes an internal threaded portion at each end thereof, the width of said threaded portion being greater than the width of said plug member.

15. An assembly as set forth in claim 14 wherein said locking means includes an internally threaded lock nut member.

16. An assembly as set forth in claim 15 wherein said housing member includes an external threaded portion at each end thereof.

17. An assembly as set forth in claim 14 wherein said bearing means includes a bearing member rotatably supporting each of said shaft member.

18. An assembly as set forth in claim 17 including movable spacer means positioned between said bearing members for establishing a fixed distance of separation between said bearing members.

19. An assembly as set forth in claim 18 including a thrust washer disposed between said plug members and said bearing members.

20. An assembly as set forth in claim 19 wherein said plug members include tool engaging means.

21. An assembly as set forth in claim 20 wherein said bearing means includes an inner race member, an outer race member, and a plurality of ball bearings disposed between said race members.

22. An assembly as set forth in claim 21 wherein said shaft member includes connection means at each end thereof for connecting a pedal arm thereto.

23. An assembly as set forth in claim 16 wherein said hub casing includes internal threaded portions at each end thereof.

24. A pedal crank shaft assembly for a bicycle having a frame and a hanger hub supported by the frame comprising: a tubular housing member axially movably supported in the hanger hub, locking means for locking said housing member in position with respect to the hanger hub, a shaft member within said housing member, bearing means rotatably supporting said shaft member, said shaft member and bearing means being axially movable within said housing member over a continuous range of adjusted positions, and adjustable retaining means movable axially with respect to said housing member for retaining said shaft member in said housing member and for effecting adjustment of the axial position of said shaft member with respect to said housing member.

25. An assembly as set forth in claim 24 wherein said adjustable retaining means includes an externally threaded plug member enclosing each end of said housing member.

26. An assembly as set forth in claim 25 wherein said housing member includes an internal threaded portion at each end thereof, the width of said threaded portion being greater than the width of said plug member.

27. An assembly as set forth in claim 26 wherein said locking means includes an internally threaded lock nut member.

28. An assembly as set forth in claim 27 wherein said housing member includes an external threaded portion at each end thereof.

29. An assembly as set forth in claim 26 wherein said bearing means includes a bearing member rotatably supporting each end of said shaft member.

30. An assembly as set forth in claim 29 including movable spacer means positioned between said bearing members for establishing a fixed distance of separation between said bearing members.

31. An assembly as set forth in claim 30 including a thrust washer disposed between said plug members and said bearing members.

32. An assembly as set forth in claim 31 wherein said plug members include tool engaging means.

33. An assembly as set forth in claim 32 wherein said bearing means includes an inner race member, an outer race member, and a plurality of ball bearings disposed between said race members.

34. As assembly as set forth in claim 33 wherein said shaft member includes connection means at each end thereof for connecting a pedal arm thereto.

35. An assembly as set forth in claim 28 wherein said hub casing includes internal threaded portions at each end thereof.

* * * * *